US008317453B2

(12) United States Patent
Givens

(10) Patent No.: US 8,317,453 B2
(45) Date of Patent: Nov. 27, 2012

(54) COMPOUND-ARM MANIPULATOR

(76) Inventor: Ray Givens, London (CA)

( * ) Notice: Subject to any disclaimer, the term of this patent is extended or adjusted under 35 U.S.C. 154(b) by 1087 days.

(21) Appl. No.: 12/121,225

(22) Filed: May 15, 2008

(65) Prior Publication Data

US 2009/0283490 A1     Nov. 19, 2009

(51) Int. Cl.
*B25J 18/00*     (2006.01)

(52) U.S. Cl. ........................ 414/680; 74/490.01; 248/325; 414/719; 414/917; 901/15

(58) Field of Classification Search .................. 414/680, 414/719, 917; 901/15, 16; 74/490.01; 248/317, 248/325
See application file for complete search history.

(56) References Cited

U.S. PATENT DOCUMENTS

| | | | | |
|---|---|---|---|---|
| 3,703,968 | A | * | 11/1972 | Uhrich et al. ............... 414/680 |
| 4,659,278 | A | * | 4/1987 | Doege et al. ............... 414/680 |
| 5,037,267 | A | * | 8/1991 | Warner et al. ............. 414/744.6 |
| 5,133,465 | A | | 7/1992 | Kalan |
| 5,350,076 | A | | 9/1994 | Kalan |
| 5,831,408 | A | | 11/1998 | Jacobus et al. |
| 5,865,426 | A | | 2/1999 | Kazerooni |
| 5,909,817 | A | | 6/1999 | Wallace et al. |
| 5,915,673 | A | | 6/1999 | Kazerooni |
| 6,204,619 | B1 | | 3/2001 | Gu et al. |
| 6,204,620 | B1 | | 3/2001 | McGee et al. |
| 6,299,139 | B1 | | 10/2001 | Kazerooni |
| 6,313,595 | B2 | | 11/2001 | Swanson et al. |
| 6,354,782 | B1 | | 3/2002 | Barry |
| 6,385,509 | B2 | | 5/2002 | Das et al. |
| 6,386,513 | B1 | | 5/2002 | Kazerooni |
| 6,554,252 | B2 | | 4/2003 | Kazerooni |
| 6,575,317 | B2 | | 6/2003 | Taylor |
| 6,612,449 | B1 | | 9/2003 | Otani et al. |
| 6,622,990 | B2 | | 9/2003 | Kazerooni |
| 6,654,665 | B2 | | 11/2003 | Arai et al. |
| 6,668,668 | B1 | | 12/2003 | Peshkin |
| 6,738,691 | B1 | | 5/2004 | Colgate et al. |
| 6,796,447 | B2 | | 9/2004 | Laundry et al. |

(Continued)

FOREIGN PATENT DOCUMENTS

CN     2697060     5/2005

(Continued)

*Primary Examiner* — Donald Underwood
(74) *Attorney, Agent, or Firm* — Millman IP Inc.

(57) ABSTRACT

In a first aspect, the invention is directed to a manipulator that is relatively compact and has a relatively large range of motion. The manipulator includes a linkage that folds back on itself, which reduces the footprint of the linkage. In a particular embodiment, the manipulator includes a linkage and a load balancing device. The linkage includes a first link, a second link, a third link and a fourth link. The first link and second links are rotatably connected to a base about first and second connection axes. The third and fourth links are connected to the first and second links respectively about third and fourth connection axes respectively. The third and fourth links are rotatably connected to a lift arm about fifth and sixth connection axes respectively, wherein the fifth and sixth connection axes are horizontally displaced from the third and fourth connection axes in the direction of the first and second connection axes. The load balancing device is configured to support the linkage in a selected position against a load and configured to permit the load to be moved upwards or downwards with a selected amount of force on the lift arm. The manipulator may be provided as part of a load maneuvering system that further includes a transport system that may be similar to that used on an overhead crane.

23 Claims, 5 Drawing Sheets

U.S. PATENT DOCUMENTS

| | | | |
|---|---|---|---|
| 6,813,542 B2 | 11/2004 | Peshkin et al. | |
| 6,837,363 B2 | 1/2005 | Munzebrock et al. | |
| 6,886,812 B2 | 5/2005 | Kazerooni | |
| 6,907,317 B2 | 6/2005 | Peshkin et al. | |
| 6,928,336 B2 | 8/2005 | Peshkin et al. | |
| 6,968,963 B1 | 11/2005 | Zakula et al. | |
| 7,028,856 B2 | 4/2006 | Laundry et al. | |
| 7,043,337 B2 | 5/2006 | Colgate et al. | |
| 7,066,343 B1 | 6/2006 | Khachaturian | |
| 7,070,061 B1 | 7/2006 | Munnekekoff | |
| 7,120,508 B2 | 10/2006 | Peshkin et al. | |
| 7,134,563 B2 | 11/2006 | Meissner et al. | |
| 7,185,774 B2 | 3/2007 | Colgate et al. | |
| 7,190,146 B1 | 3/2007 | Kureck | |
| 7,222,839 B2 | 5/2007 | Taylor et al. | |
| 7,252,203 B2 | 8/2007 | Frankenberger et al. | |
| 7,289,876 B2 | 10/2007 | Lussen et al. | |
| 7,293,761 B2 | 11/2007 | Malek et al. | |
| 2003/0164348 A1 | 9/2003 | Seng | |
| 2005/0207872 A1 | 9/2005 | Taylor et al. | |
| 2007/0023999 A1* | 2/2007 | Horie et al. | 271/277 |
| 2007/0205405 A1 | 9/2007 | Stockmaster et al. | |

FOREIGN PATENT DOCUMENTS

| | | |
|---|---|---|
| CN | 2732708 | 10/2005 |
| CN | 200948591 | 9/2007 |
| DE | 3933759 | 4/1991 |
| DE | 4335146 | 12/1994 |
| EP | 1468958 | 10/2004 |
| GB | 2297962 | 8/1996 |
| JP | 9012266 | 1/2002 |
| RU | 2276095 | 5/2006 |
| SU | 1646980 | 5/1991 |
| WO | WO 02/064488 | 8/2002 |
| WO | WO 2007/143841 | 12/2007 |

* cited by examiner

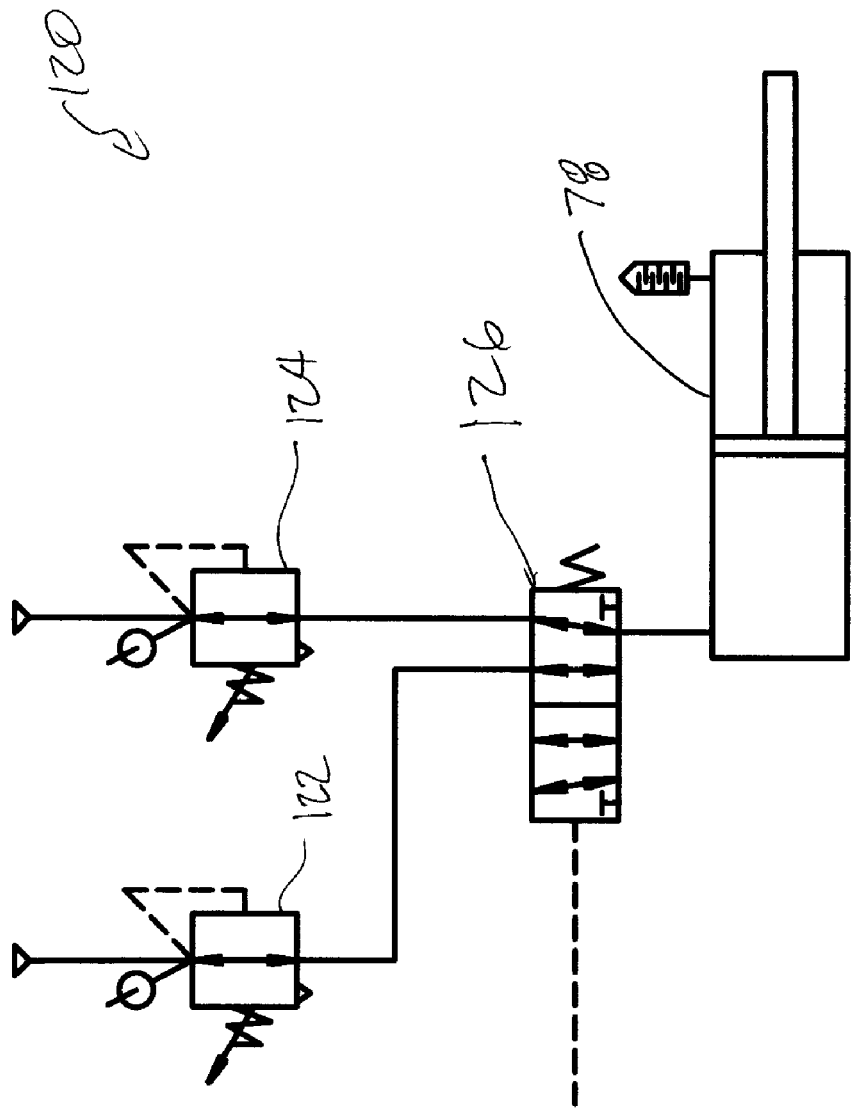

COMPOUND-ARM MANIPULATOR

FIELD OF THE INVENTION

The present invention relates to load maneuvering systems, and more particularly to a load maneuvering system that incorporates a manipulator.

BACKGROUND OF THE INVENTION

An overhead crane typically includes a pair of runway rails, a bridge that runs on the runway rails, a carriage that runs on rails on the bridge and a chain hoist or some similar structure that is connected to the carriage for raising and lowering objects. An overhead crane may be able to reach a relatively large amount of floor space. A significant disadvantage, however with a typical overhead crane is that the operator receives no tactile feedback from the hoist. As a result, the task of fitting the object being carried into a fixture or placing a heavy object lightly in contact with another object is relatively difficult.

It would be advantageous to provide a system that permits the operator to receive tactile feedback during such operations, and to permit the operator to have relatively fine control of the movement of the object being carried.

SUMMARY OF THE INVENTION

In one aspect, the invention is directed to a manipulator that is relatively compact and has a relatively large range of motion. The manipulator includes a linkage that folds back on itself. This reduces the footprint of the linkage. In a particular embodiment, the manipulator includes a linkage and a load balancing device. The linkage includes a first link, a second link, a third link and a fourth link. The first link and second links are rotatably connected to a base about first and second connection axes. The third and fourth links are connected to the first and second links respectively about third and fourth connection axes respectively. The third and fourth links are rotatably connected to a lift arm about fifth and sixth connection axes respectively, wherein the fifth and sixth connection axes are horizontally displaced from the third and fourth connection axes in the direction of the first and second connection axes. The load balancing device is configured to support the linkage in a selected position against a load and configured to permit the load to be moved upwards or downwards with a selected amount of force on the lift arm.

In another particular embodiment, the invention is directed to a load maneuvering system that includes a transport system, such as an overhead crane, and the manipulator described above. The transport system may be configured to move the manipulator in at least one horizontal direction, and preferably in two orthogonal horizontal directions.

BRIEF DESCRIPTION OF THE DRAWINGS

The present invention will now be described by way of example only with reference to the attached drawings, in which:

FIG. 5 is a diagram of a fluid circuit that is included as part of the load maneuvering system shown in FIG. 1.

DETAILED DESCRIPTION OF THE INVENTION

Figure 1:
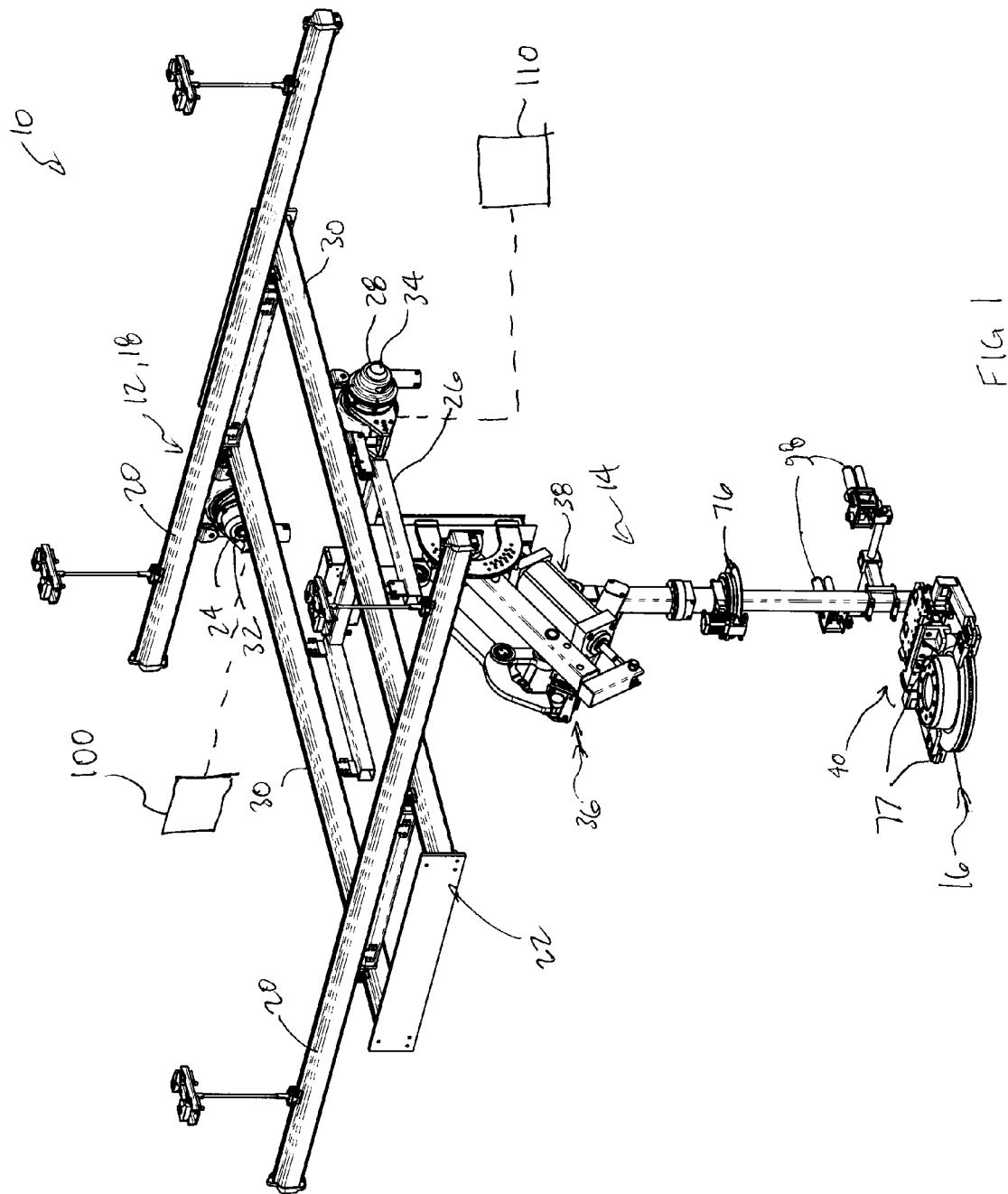
FIG. 1 is a perspective view of a load maneuvering system for in accordance with an embodiment of the present invention.

Reference is made to FIG. 1, which shows a load maneuvering system 10 for moving a load, in accordance with an embodiment of the present invention. The load maneuvering system 10 includes a transport system 12 and a manipulator 14.

The transport system 12 may be configured to support horizontal movement of the manipulator 14, and the manipulator 14 may be configured to support vertical movement of an object 16, which may also be referred to as a load 16.

The transport system 12 may be any suitable type of transport system, such as an overhead crane system 18. The overhead crane system 18 may include a pair of runway rails 20, a bridge 22, a bridge drive system 24, a carriage 26 and a carriage drive system 28.

The runway rails 20 together make up the runway and are fixable to any suitable location such as the ceiling of an industrial facility. The bridge 22 rides on and spans the runway rails 20 and is movable in a first horizontal direction. The bridge 22 includes a pair of bridge rails 30, which may be oriented horizontally perpendicularly to the runway rails 20. The bridge drive system 24 moves the bridge 22 along the runway rails 20 and includes an electric motor 32 or some other suitable drive means. The bridge drive system 24 may be controlled by means of a bridge drive system controller 100.

The carriage 26 is movable along the bridge rails 30 in a second horizontal direction that is horizontally perpendicular to the first horizontal direction. The carriage drive system 28 moves the carriage 26 along the bridge rails 30 and may include an electric motor 34 or some other suitable drive means. The bridge drive system 24 may be controlled by means of a carriage drive system controller 110.

Figure 2:
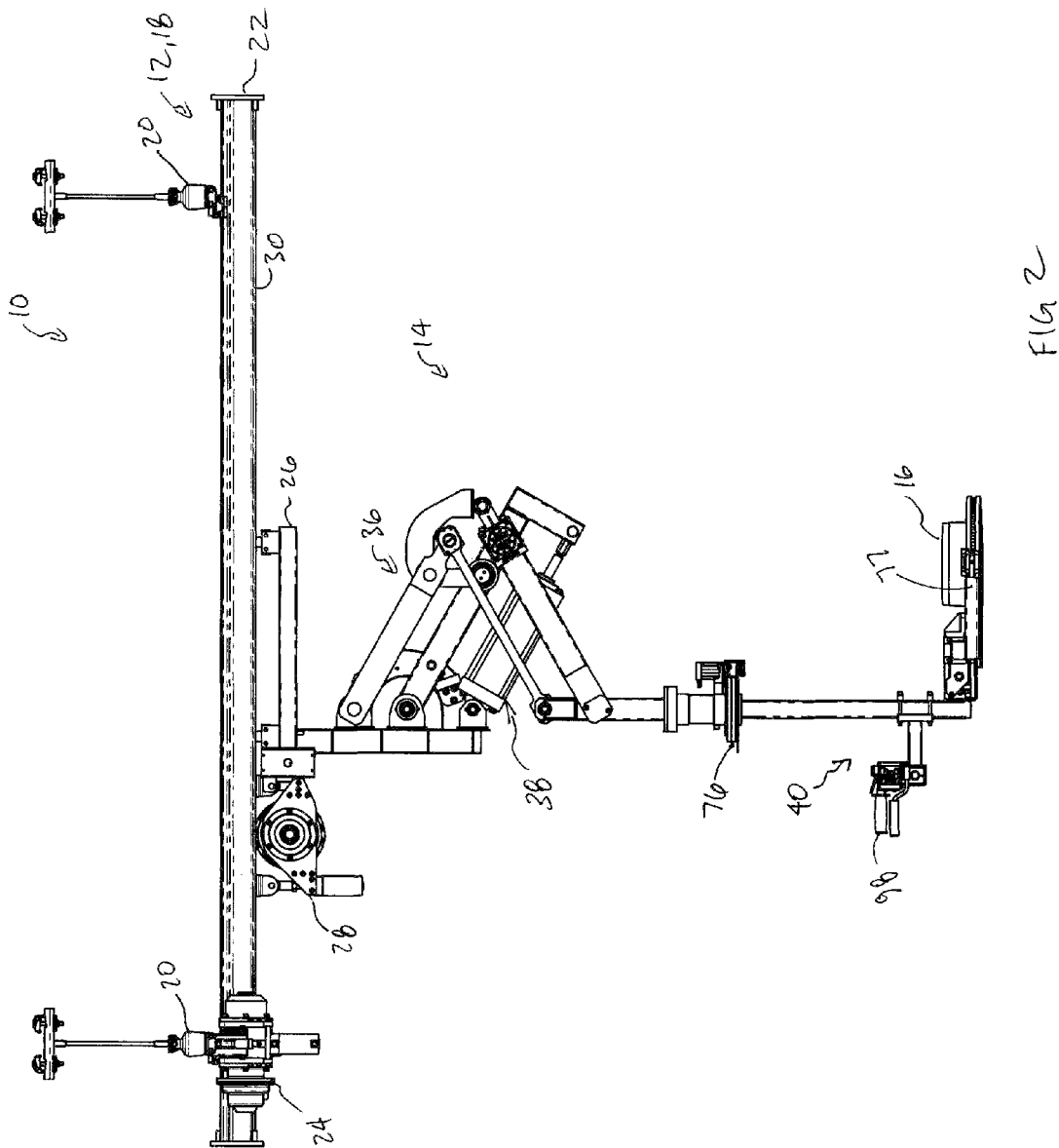
FIG. 2 is an elevation view of the load maneuvering system shown in FIG. 1.
Figure 3:
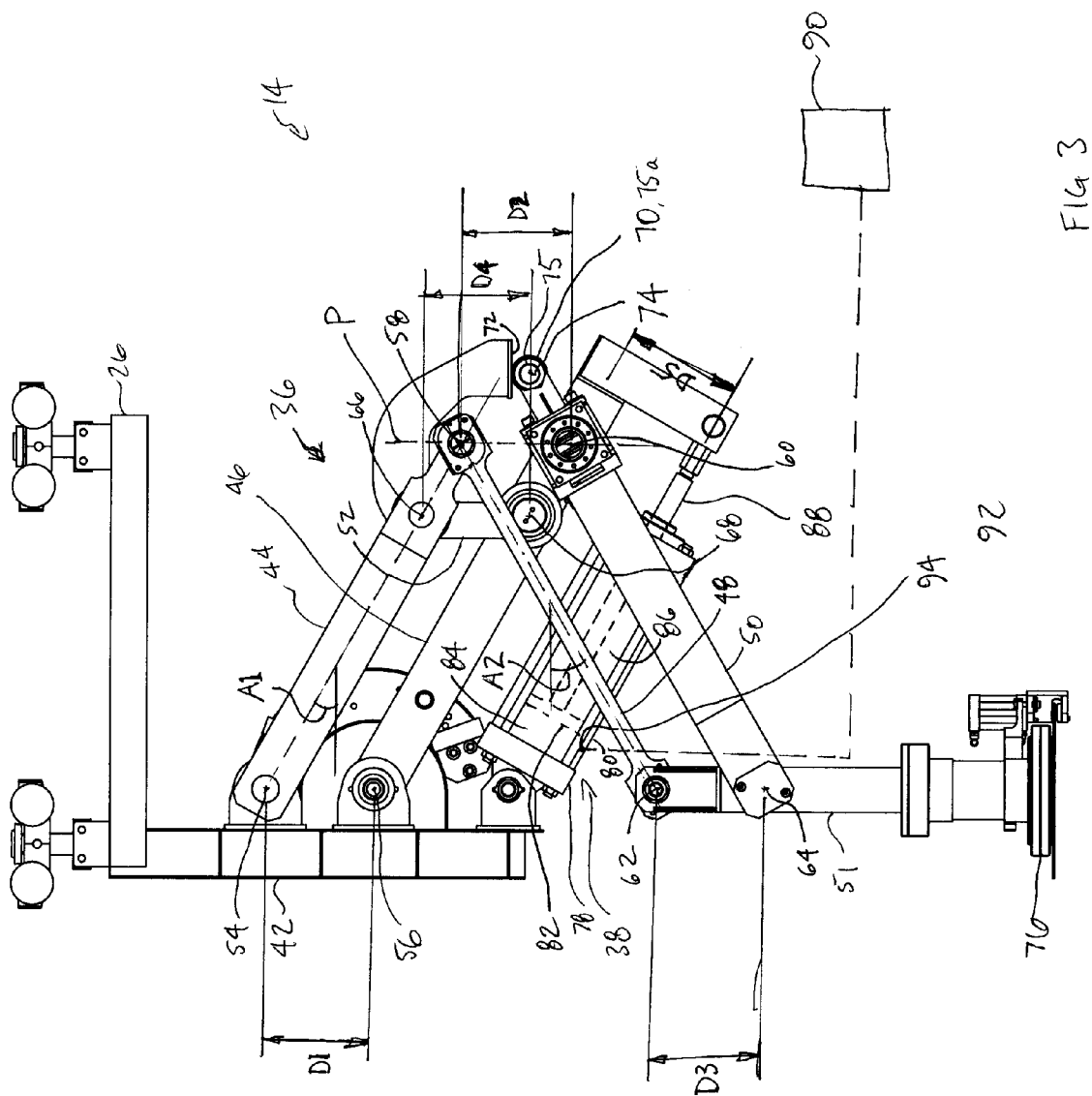
FIG. 3 is a magnified elevation view of a manipulator that is part of the load maneuvering system shown in FIG. 1.
Figure 4:
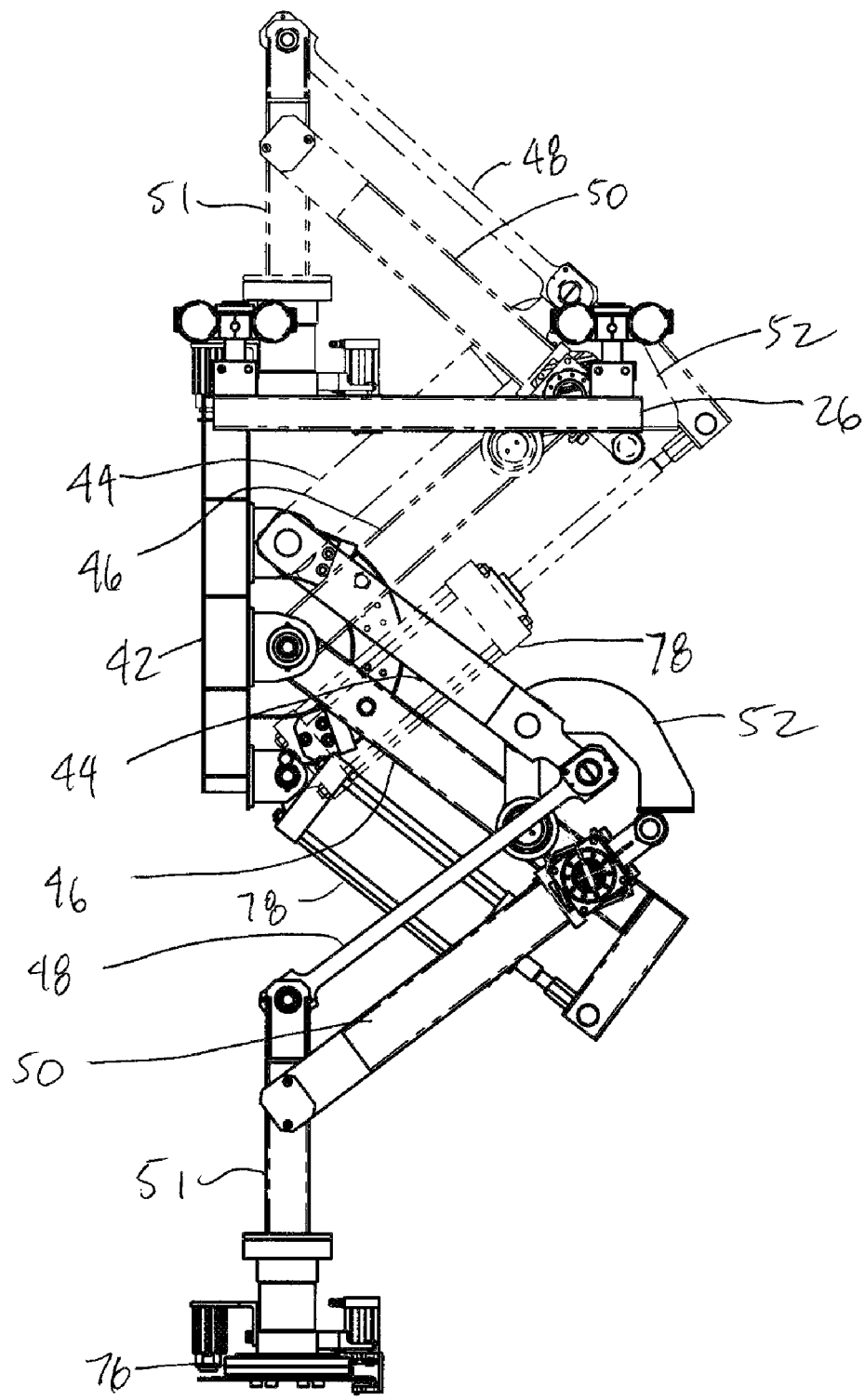
FIG. 4 is a magnified elevation view of the manipulator shown in FIG. 3, illustrating it in both a downward position and an upward position.

Reference is made to FIGS. 2, 3 and 4 which show the manipulator 14 in particular. In FIGS. 2 and 3, the manipulator 14 is shown in a lowered position. In FIG. 4, the manipulator 14 is shown in both a lowered position (in solid lines) and in a raised position (in broken lines). Referring to FIG. 2, the manipulator 14 includes a linkage 36, a load balancing system 38 and an optional end effector 40. Referring to FIG. 3, the linkage 36 includes a base 42, a first link 44, a second link 46, a third link 48, a fourth link 50, a lift arm 51 and a control arm 52. The first and second links 44 and 46 are rotatably connected to the base 42 about first and second connection axes 54 and 56 respectively. The first and second connection axes 54 and 56 may be substantially vertically spaced apart, and have a first connection spacing D1.

The third and fourth links 48 and 50 may be rotatably connected to the first and second links 44 and 46 about third and fourth connection axes 58 and 60. The third and fourth connection axes 58 and 60 may be substantially vertically spaced apart, and have a second connection spacing D2, which may be the same as D1. The third and fourth links 48 and 50 are rotatably connected to the lift arm 51 about fifth and sixth connection axes 62 and 64 respectively. The fifth and sixth connection axes 62 and 64 may be substantially vertically spaced apart, and have a third connection spacing D3, which may be the same as D1.

By having the first and second connection spacings D1 and D2 be vertical and be the same, the third and fourth connection axes 58 and 60 remain directly vertically spaced from each other throughout the range of motion of the linkage 36. By having the first, second and third connection spacings D1, D2 and D3 be vertical and be the same, the fifth and sixth connection axes 62 and 64 remain directly vertically spaced from each other throughout the range of motion of the linkage 36.

In any given position of the linkage 36, the first and second links 44 and 46 (in embodiments wherein they are parallel) have a first angle A1 relative to the horizontal. It will be understood that the angle A1 may be zero (ie. when the first and second links 44 and 46 themselves extend horizontally. Also at any given position of the linkage, the third and fourth links 48 and 50 extend at an angle A2 from the horizontal. The third and fourth links 48 and 50 may be maintained in an orientation relative to the first and second links 44 and 46 whereby the angle A2 is always the negative of the angle A1. In other words, if the first and second links 44 and 46 are at a selected number of degrees above the horizontal, then the third and fourth links 48 and 50 may be oriented at the same number of degrees below the horizontal, as shown when the linkage 36 is in the position shown in FIG. 3.

By having the first, second and third connection spacings D1, D2 and D3 be vertical and be the same size, by having the angles A1 and A2 be negatives of each other, and by having the arm lengths from axis 54 to axis 58 and from axis 58 to axis 62 be equal to each other (and the arm lengths from axis 56 to axis 60 and from axis 60 to axis 64 be equal to each other), the range of motion of the end effector 40 itself as a result of flexure of the linkage 36 is strictly vertical. This facilitates the lowering of a load 16 into a selected position by an operator using the load maneuvering system 10, because there is no horizontal offset that is incurred by the load 16 during its lowering into the selected position.

It will be noted that the third and fourth connection axes 58 and 60 are horizontally displaced from the first and second connection axes 54 and 56 in a first direction away from the first and second connection axes 54 and 56, and that the fifth and sixth connection axes 62 and 64 are horizontally displaced from the third and fourth connection axes 58 and 60 in a second direction, which is generally towards the first and second connection axes 54 and 56. As a result, the linkage 36 is more compact than other linkages that incorporate only two links.

Optionally, the fifth and sixth connection axes 62 and 64 are substantially vertically spaced from the first and second connection axes 54 and 56. As a result, the overall footprint of the linkage 36 is minimized for a given amount of vertical range of motion of the linkage 36.

The control arm 52 spaces the third and fourth connection axes 58 and 60 by a selected amount, which is the second connection spacing D2. The control arm 52 may achieve this by being rotatably connected to the first and second links 44 and 46. The rotatable connections of the control arm 52 with the first and second links 44 and 46 takes place about seventh and eighth connection axes 66 and 68 respectively. The seventh and eighth connection axes 66 and 68 may be substantially vertically spaced apart, and are spaced apart by a fourth connection spacing D4 that is the same as the second connection spacing D2.

A mechanism is provided to hold the third and fourth links 48 and 50 in their selected orientation relative to the first and second links 44 and 46. The mechanism may have any suitable structure. For example, the mechanism may include a first bearing surface 70 that is positioned on the fourth link 50. The first bearing surface 70 engages a second bearing surface 72 on the control arm 52. As the linkage 36 flexes, the control arm 52 remains in a consistent orientation (eg. vertical), and as a result, the second bearing surface 72 remains in a constant orientation (eg. horizontal).

The first bearing surface 70 may be arcuate and may have a first bearing surface axis 74 associated therewith, and the second bearing surface 72 may be planar. The first bearing surface 70 may be positioned on the fourth link 50 so that there is symmetry between the first bearing surface axis 74, and the eighth connection axis 68 (relating to the connection between the control arm 52 and the second link 46) about a vertical plane P containing the fourth connection axis 60 (relating to the connection between the second link 46 and the fourth link 50. This symmetry remains present throughout the range of motion of the linkage 36, and so the first bearing surface 70 engages the second bearing surface 72 throughout the range of motion of the linkage 36.

The first bearing surface 70 may be the peripheral surface 75a of a roller 75, as shown in FIG. 3. Alternatively, the first bearing surface 70 may be a non-rotating surface and the first and second bearing surfaces 70 and 72 may be configured so that there is low sliding friction therebetween. For example, the roller 75 could be replaced by a linear bearing that is non-rotating and that mates with a second bearing surface 72 that is suitably configured.

The engagement between the first bearing surface 70 and the second bearing surface 72 stops the third and fourth links 48 and 50 from rotating downwards about the connection axes 58 and 60 from the weight of the load 16 and thus holds the third and fourth links 48 and 50 in a selected orientation relative to the first and second links 44 and 46.

The linkage 36 may be configured so that the first and second bearing surfaces 70 and 72 are positioned on other links instead of the fourth link 50 and the control arm 52. For example, a first bearing surface could be provided on the third link 48 and a second bearing surface could be provided on the control arm 52 that engages the first bearing surface such that there is symmetry with the seventh connection axis 66 about a vertical plane passing through the third connection axis 58.

Referring to FIG. 2, the end effector 40 may be any suitable type of end effector, and may be configured to hold a load 16 by any suitable means, such as by closure of jaws 77 around the load 16. The end effector 40 may be connected to the lift arm 51 by any suitable means, such as by a rotatable connector 76 that permits rotation of the end effector 40 about a vertical axis.

The load balancing device 38 is configured to support the linkage 36 in any selected position against the weight of the load 16, and is configured to permit the load 16 to be moved upwards or downwards by a selected amount of force on the lift arm 51. Referring to FIG. 3, the load balancing device 38 may be any suitable type of load balancing device. For example, the load balancing device 38 may comprise a cylinder 78. The cylinder 78 may be connected between the base 42 and the second link 46 in such a way as to control the angular position of the second link 46. The cylinder 78 includes a housing 80, a piston 82 that divides the housing into a first chamber 84 and a second chamber 86, and a rod 88 connected to the piston 82. The housing 80 may be connected to the base 42 and the rod 88 may be connected to the second link 46.

The first chamber 84 of the cylinder 78 may be pressurized, while the second chamber 86 may be open to atmosphere and is therefore at atmospheric pressure.

A lift controller 90 is provided to control the cylinder 78 so that a selected degree of force is required for an operator to move the lift arm 51 up or down. When the operator moves the end effector 40, a pressure sensor 94 senses a pressure change that takes place in the first cylinder chamber 84 as a result of the movement of the end effector 40. The pressure sensor 94 sends signals indicative of the change in pressure to the lift controller 90. In response, the lift controller 90 adjusts the pressure in the first cylinder chamber 84 to permit the movement of the cylinder piston 82 in the desired direction with a selected amount of force on the end effector 40.

An exemplary fluid circuit is shown at 120 in FIG. 5, and includes a first precision regulator 122, a second precision regulator 124, a control valve 126, and the cylinder 78. The first and second regulators 122 and 124 receive pressurized gas (eg. pressurized air) from a source of pressurized gas (not shown), such as, for example, a compressed air line in the facility in which the load maneuvering system 10 is installed. The control valve 126 is operable by any suitable means, such as by the operator manually, to select which of the precision regulators 122 or 124 is in fluid communication with the cylinder 78. Each precision regulator 122 and 124 is configured to bring the first chamber 84 to a selected unique pressure. For example, the first precision regulator 122 may be configured to bring the first chamber 84 to a first selected pressure for holding the manipulator 14 in position against its own weight (so that it 'floats') when the manipulator 14 is not holding a load. The second precision regulator 124 may be configured to bring the first chamber 84 to a second selected pressure for holding the manipulator 14 in position against its own weight and the weight of the load 16. It will be understood that additional precision regulators could be included with the load maneuvering system 10 for holding the cylinder 78 at selected pressures for holding the manipulator 14 in any selected position while holding different weights of loads.

The lift controller 90 may be configured to adjust the pressure as necessary in the cylinder chamber 84 so that a constant force is required to move the load 16 throughout the range of motion of the linkage 36, regardless of whether the load 16 is being moved upwards or downwards.

The lift controller 90, the bridge drive system controller 100 and the carriage drive system controller 110 may all be separate controllers, as shown in the figures. Alternatively, the lift controller 90, the bridge drive system controller 100 and the carriage drive system controller 110 may all be the same controller notwithstanding that they are shown as separate controllers in the figures. As another alternative, any two of the controllers 90, 100 and 110 could be combined into a single controller, such as, for example, the bridge drive system controller 100 and the carriage drive system controller 110.

There is an inherent resistance to movement of the lift arm 51 that result from a frictional force associated with movement of the components of the manipulator 14 including the relative movement of the members 42, 44, 46, 48, 50, 51 and 52 and movement of the cylinder 78. In the embodiment shown in the figures, the movement of the members 42, 44 46, 48, 50, 51 and 52 is carried out without the use of linear bearings and instead may be achieved using rotary bearings, such as ball bearings, which have relatively low internal friction associated therewith.

Additionally, the moment arm, shown at D5, between the cylinder 78 and the second connection axis 56 may be selected to be relatively small, which results in a relatively small change in length of the cylinder 78 that results from a relatively large vertical distance traveled by the end effector 40. As a result of the small moment arm D5, a relatively small force is required on the end effector 40 to overcome the frictional force associated with retraction or extension of the cylinder 78.

The manipulator 14 has been described as being configured such that only the pressure in the first cylinder chamber 84 is adjusted, while the pressure in second cylinder chamber 86 is kept at atmospheric pressure. It will be noted that it is alternatively possible to configure the manipulator 14 to adjust the pressures in both the first and second chambers 84 and 86 and to receive pressure sensor information from both cylinder chambers 84 and 86, using two pressure sensors 94.

The end effector 40 is shown as being included as part of the load maneuvering system 10. It is possible, however, that the load maneuvering system may be provided without it, with the expectation that the customer will provide an end effector themselves for mounting to the lift arm 51.

In the figures, the load maneuvering system 10 shown includes both the transport system 12 and the manipulator 14. It is possible however, for the manipulator 14 to be provided without the transport system 12 in some situations, such as, for example, in situations where the manipulator 14 will be fitted to a transport system that is provided by a customer.

The linkage 36 shown in the figures includes first, second, third and fourth links 44, 46, 48 and 50 that are generally straight, ie. that extend generally linearly between their connections to each other and to other links. It will be understood that any of the links 44, 46, 48 and 50 may alternatively have other-than-straight configurations however, while still connecting to all other components at the same positions.

The first, second and third connection axis spacings D1, D2 and D3 have been shown to be the same. For greater clarity it will be understood that these spacings D1, D2 and D3 do not all have to be the same. For example, all of the spacings D1, D2 and D3 could be different from each other. As another example, two of the spacings D1, D2 and D3 may be the same and one of the spacings D1, D2 and D3 may be different than the other two.

The linkage 14 shown in the figures provides for strictly vertical movement of the end effector 40 and lift arm 51, which is advantageous as noted above, but is not a necessary feature of the linkage 14. It is alternatively possible for the linkage 14 to be configured (eg. by varying the individual connection axis spacings D1, D2 and D3 from each other) so that there is some horizontal and/or rotational movement of the lift arm 51 and end effector 40 during flexure of the linkage 14.

When lifting or lowering an object 16, the operator holds onto handgrips 98 that are provided on the end effector 40. In some embodiments, such as the embodiment shown in the figures wherein the object 16 is rigidly held by the end effector 40, the operator is provided with good tactile feedback during a maneuvering operation. For example, if the object is to be positioned in a fixture, the operator receives feedback through the end effector 40 as to whether the object 16 is about to jam. Upon receiving this feedback, the operator can act accordingly. Such feedback is not provided by some prior art load maneuvering systems that incorporate a hoist, which is typically operated by a pendant control.

Additionally, because the operator moves the end effector 40 directly with his/her hands (as opposed to moving it through a remote control), the manipulator 14 may be moved at high speed when it is desired to move an object 16 quickly, and may be moved at slow speed and in relatively small increments when it is needed for delicate operations such as fitting the object 16 into a relatively tight fitting fixture. Configuring the manipulator 14 so that a relatively small force is required to move the load 16 as described above improves the control of the movement of the load 16 even further. In embodiments wherein the object 16 is rigidly held by the end effector 40 (eg. by jaws 77) the tactile feedback to the operator is further improved. Some tactile feedback is provided to the operator however, simply by having the handgrips 98 on the end effector 40 even if the load 16 were not rigidly held by the end effector 40.

By contrast, some pendant controls for hoists do not permit any adjustment of the speed of lifting or descent and move in relatively large increments when jogged by the operator.

Yet another advantage to providing the manipulator 14 is that it can be provided with a suitably configured end effector 40 for reaching objects 16 that are positioned under overhead obstructions (not shown).

While jaws 77 have been shown for use in holding the object 16 it is possible to hold an object 16 rigidly by other means, such as by magnetic attraction.

While handgrips 98 that extend outwardly from the rest of the end effector for easy grasping by the operator have been shown, it is alternatively possible for the end effector 40 to be configured to be handled directly by an operator in some other way, such as by having hand-receiving slots machined therein.

Another advantage of the manipulator 14 is that it has a relatively small footprint compared to some other manipulators, and has a large vertical travel relative to its footprint. Additionally, the manipulator 14 in some embodiments provides for strictly vertical travel of the end effector 40, which simplifies the maneuvering of a load 16. In combination with the transport system 12 which can provide for separate movement on two orthogonal horizontal axes, each axis of movement of the load 16 can be controlled independently. Additionally, the manipulator 14 in some embodiments holds the end effector 40 directly under the carriage 26 so that there is no large offset between the position of the carriage 26 and the position of the end effector 40 that needs to be accounted for when moving the carriage 26 and bridge 22. Additionally, embodiments of the manipulator 14 that incorporate an end effector 40 that includes jaws 77 or that otherwise rigidly holds an object 16 permit an object 16 to be gripped and lifted from one end, which is not easily done with a lifting device such as a hoist.

The load maneuvering system 10 may be configured to be controlled by the handgrips 98 for horizontal movement. For example, the manipulator 14 may be equipped with sensing means to determine in what horizontal direction the operator wishes to move the end effector 40. The bridge and carriage drive system controllers 100 and 110 can receive signals from the sensing means and can control the bridge drive system 24 and the carriage drive system 28 accordingly to move the manipulator 14 in the selected direction. The sensing means may operate in any suitable way. For example, the handgrips 98 may be slightly movable by the operator and their movement may trip sensors that make up the sensing means. Alternatively, controls such as pushbuttons or finger-actuated levers may be provided proximate the handgrips 98 for actuation by the operator. Thus the controls (eg. the pushbuttons or levers) constitute sensing means. Alternatively, some other suitable arrangement may be provided.

The lift controller 90 has been described as using the sensed pressure from the pressure sensor 94 to indicate the operator's intent regarding raising or lowering of the end effector 40. It is alternatively possible for some other input means to be provided for indicating the operator's intent. For example, the hand grips 98 may be slightly movable along a vertical axis, which could trip suitably positioned sensors (not shown) for determining whether the operator wishes to move the end effector 40 up or down.

As another alternative for controlling either or both of the horizontal and vertical movement of the manipulator 14, a pendant control (not shown) may be provided, notwithstanding that the pendant control would eliminate some of the advantages of providing a manipulator 14 instead of a hoist in the load maneuvering system 10.

While the above description constitutes a plurality of embodiments of the present invention, it will be appreciated that the present invention is susceptible to further modification and change without departing from the fair meaning of the accompanying claims.

The invention claimed is:

1. A manipulator, comprising:
   a linkage including a first link, a second link, a third link and a fourth link, wherein the first link and second links are rotatably connected to a base about first and second connection axes, wherein the third and fourth links are connected to the first and second links respectively about third and fourth connection axes respectively, wherein the third and fourth links are rotatably connected to a lift arm about fifth and sixth connection axes respectively, wherein the fifth and sixth connection axes are horizontally displaced from the third and fourth connection axes in the direction of the first and second connection axes;
   a load balancing device connected between the base and the linkage to support the linkage in a selected position against a load and configured to permit the load to be moved upwards or downwards with a selected amount of force on the lift arm;
   a control arm, wherein the control arm is rotatably connected to each of the first and second links at seventh and eighth connection axes which are substantially vertically spaced from each other by a fourth connection spacing that is the same as the first connection spacing; and
   a first bearing surface and a second bearing surface, wherein the first bearing surface is positioned on one of the links and the second bearing surface is positioned on the control arm, wherein the first and second bearing surfaces engage each other to hold the third and fourth links in a selected orientation relative to the first and second links,
   wherein the first and second connection axes are substantially vertically spaced from each other by a connection spacing, and wherein the third and fourth connection axes are substantially vertically spaced from each other by a second connection spacing that is the same as the first connection spacing,
   wherein the fifth and sixth connection axes are substantially vertically spaced from each other by a third connection spacing that is the same as the first connection spacing.

2. A manipulator as claimed in claim 1, wherein the third and fourth links are directly connected to the first and second links respectively.

3. A manipulator as claimed in claim 1, wherein the first and second connection axes are substantially vertically spaced from the fifth and sixth connection axes.

4. A manipulator as claimed in claim 1, wherein the second bearing surface guides the first bearing surface in a straight line.

5. A manipulator as claimed in claim 4, wherein the first bearing surface is an outer surface of a roller and the second bearing surface is a rolling surface.

6. A manipulator as claimed in claim 1, wherein the first and second links extend from the base at a first angle relative to the horizontal and wherein the third and fourth links extend towards the lift arm at a second angle relative to the horizontal that is the negative of the first angle.

7. A manipulator as claimed in claim 1, further comprising an end effector connected to the lift arm, wherein the end effector is configured to hold a load and to be directly handled by an operator.

8. A manipulator as claimed in claim 7, wherein the end effector is rotatably connected to the lift arm.

9. A manipulator as claimed in claim 1, wherein the load balancing device includes a cylinder that is positionable to hold the linkage at a selectable position within a range of movement for the linkage.

10. A manipulator as claimed in claim 9, further comprising a lift controller, a pressure regulator and a sensing means, wherein the sensing means is configured to send signals to the lift controller indicative of whether movement of the lift arm urges the cylinder to retract or extend, wherein the cylinder includes a first cylinder chamber and a second cylinder chamber and the lift controller is configured to control differential pressure between the first and second chambers based on the signals, so as to permit the cylinder to extend or retract in response to the signals.

11. A manipulator as claimed in claim 10, wherein the sensing means includes a pressure sensor positioned to send signals to the lift controller indicative of the pressure in the first chamber.

12. A load maneuvering system, comprising:
a transport system; and
a manipulator including:
a linkage including a first link, a second link, a third link and a fourth link, wherein the first link and second links are rotatably connected to a base about first and second connection axes, wherein the base is connected to the transport system and is movable horizontally thereby, wherein the third and fourth links are connected to the first and second links respectively about third and fourth connection axes respectively, wherein the third and fourth links are rotatably connected to a lift arm about fifth and sixth connection axes respectively, wherein the fifth and sixth connection axes are horizontally displaced from the third and fourth connection axes in the direction of the first and second connection axes;
a load balancing device connected between the base and the linkage to support the linkage in a selected position against a load and configured to permit the load to be moved upwards or downwards with a selected amount of force on the lift arm;
a control arm, wherein the control arm is rotatably connected to each of the first and second links at seventh and eighth connection axes which are substantially vertically spaced from each other by a fourth connection spacing that is the same as the first connection spacing; and
a first bearing surface and a second bearing surface, wherein the first bearing surface is positioned on one of the links and the second bearing surface is positioned on the control arm, wherein the first and second bearing surfaces engage each other to hold the third and fourth links in a selected orientation relative to the first and second links,
wherein the first and second connection axes are substantially vertically spaced from each other by a connection spacing, and wherein the third and fourth connection axes are substantially vertically spaced from each other by a second connection spacing that is the same as the first connection spacing,
wherein the fifth and sixth connection axes are substantially vertically spaced from each other by a third connection spacing that is the same as the first connection spacing.

13. A load maneuvering system as claimed in claim 12, wherein the third and fourth links are directly connected to the first and second links respectively.

14. A load maneuvering system as claimed in claim 12, wherein the first and second connection axes are substantially vertically spaced from the fifth and sixth connection axes.

15. A load maneuvering system as claimed in claim 12, wherein the second bearing surface guides the first bearing surface in a straight line.

16. A load maneuvering system as claimed in claim 15, wherein the first bearing surface is an outer surface of a roller that is positioned on the fourth link and the rolling surface is positioned on the control arm.

17. A load maneuvering system as claimed in claim 12, wherein the first and second links extend from the base at a first angle relative to the horizontal and wherein the third and fourth links extend towards the lift arm at a second angle relative to the horizontal that is the negative of the first angle.

18. A load maneuvering system as claimed in claim 12, further comprising an end effector connected to the lift arm, wherein the end effector is configured to hold a load and to be directly handled by an operator.

19. A load maneuvering system as claimed in claim 18, wherein the end effector is rotatably connected to the lift arm.

20. A load maneuvering system as claimed in claim 12, wherein the load balancing device includes a cylinder that is positionable to hold the linkage at a selectable position within a range of movement for the linkage.

21. A load maneuvering system as claimed in claim 20, further comprising a lift controller, a pressure regulator and a sensing means, wherein the sensing means is configured to send signals to the lift controller indicative of whether movement of the lift arm urges the cylinder to retract or extend, wherein the cylinder includes a first cylinder chamber and a second cylinder chamber and the lift controller is configured to control differential pressure between the first and second chambers based on the signals, so as to permit the cylinder to extend or retract in response to the signals.

22. A load maneuvering system as claimed in claim 21, wherein the sensing means includes a pressure sensor positioned to send signals to the lift controller indicative of the pressure in the first chamber.

23. A load maneuvering system as claimed in claim 12, wherein the transport system includes a pair of runway rails that extend in a first horizontal direction, a bridge that is movable on the runway rails, wherein the bridge has a pair of bridge rails thereon that extend in a second horizontal direction that is perpendicular to the first horizontal direction, and a carriage that is movable on the bridge rails, wherein the base is connected to the carriage.

* * * * *